(12) United States Patent
Choi et al.

(10) Patent No.: US 7,957,248 B2
(45) Date of Patent: Jun. 7, 2011

(54) APPARATUS AND METHOD OF RECORDING/REPRODUCING HOLOGRAM AND HOLOGRAM RECORDING MEDIUM

(75) Inventors: Jong-chul Choi, Suwon-si (KR);
Taek-seong Jeong, Suwon-si (KR);
Moon-Il Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1140 days.

(21) Appl. No.: 11/642,779

(22) Filed: Dec. 21, 2006

(65) Prior Publication Data
US 2008/0019251 A1 Jan. 24, 2008

(30) Foreign Application Priority Data
May 3, 2006 (KR) .......................... 10-2006-0040119

(51) Int. Cl.
*G11B 7/00* (2006.01)
(52) U.S. Cl. ......................................... 369/103
(58) Field of Classification Search .................... 369/103
See application file for complete search history.

(56) References Cited

U.S. PATENT DOCUMENTS

| 6,064,586 | A * | 5/2000 | Snyder et al. ................. 365/125 |
| 6,816,291 | B2 * | 11/2004 | Tanaka et al. ................... 359/22 |
| 7,116,626 | B1 * | 10/2006 | Woods et al. ................. 369/103 |
| 7,206,108 | B2 * | 4/2007 | Tsukagoshi ..................... 359/35 |
| 2005/0018263 | A1 | 1/2005 | Pharris |
| 2005/0122551 | A1 * | 6/2005 | Baba et al. ....................... 359/11 |
| 2005/0162719 | A1 | 7/2005 | Ogasawara et al. |
| 2005/0185233 | A1 | 8/2005 | Baba et al. |
| 2006/0114536 | A1 * | 6/2006 | Uno et al. ........................ 359/24 |
| 2006/0215528 | A1 * | 9/2006 | Hirao et al. ................... 369/103 |
| 2007/0076281 | A1 * | 4/2007 | Uchida et al. ................... 359/24 |
| 2007/0245363 | A1 * | 10/2007 | Bakker et al. ................. 720/672 |

FOREIGN PATENT DOCUMENTS

| KR | 2005-63600 | 6/2005 |
| WO | WO 99/44102 | 9/1999 |
| WO | WO 2004/064050 | 7/2004 |

OTHER PUBLICATIONS

European Search Report dated Mar. 11, 2009 of the European Patent Application No. 07746145.7.
Search Report issued on Jul. 25, 2007 by the International Searching Authority for PCT International Application No. PCT/KR2007/001983.
Chinese Office Action issued on Apr. 23, 2010, in corresponding Chineses Application No. 200780014928.3 (6 pages).

* cited by examiner

*Primary Examiner* — Adam R Giesy
(74) *Attorney, Agent, or Firm* — NSIP Law (57) ABSTRACT

A hologram recording and/or reproducing apparatus, a hologram recording and/or reproducing method, and a hologram recording medium include a data processing unit to generate a data page which includes recording data and a reference page which includes predetermined patterns to prevent distortion of a signal from occurring when the data page is reproduced, and a light processing unit to record the data page and reference page on a hologram recording medium. The apparatus and method correct distortion and deformation that may occur in part of an image due to aberrations, enhancing compatibility between hologram recording and/or reproducing apparatuses.

29 Claims, 10 Drawing Sheets

APPARATUS AND METHOD OF RECORDING/REPRODUCING HOLOGRAM AND HOLOGRAM RECORDING MEDIUM

CROSS-REFERENCE TO RELATED APPLICATION

This application claims the benefit of Korean Application No. 2006-40119, filed May 3, 2006, in the Korean Intellectual Property Office, the disclosure of which is incorporated herein by reference.

BACKGROUND OF THE INVENTION

1. Field of the Invention

Aspects of the present invention relate to a hologram recording and/or reproducing apparatus, a hologram recording and/or reproducing method, and a hologram recording medium, and more particularly, to a hologram recording and/or reproducing apparatus, a hologram recording and/or reproducing method, and a hologram recording medium which enhance compatibility between apparatuses for recording and/or reproducing holograms.

2. Description of the Related Art

Since an optical system using a lens is used to reproduce data on a hologram recording medium, aberrations among reproducing apparatuses are not identical. The aberrations are primarily generated by the lens, but the aberrations may also be generated by other optical components as well, such as prisms, mirrors, and light sources. When data is recorded on a hologram recording medium by one apparatus and reproduced by another apparatus, and the two apparatuses have different aberrations, the quality of the reproduced signal is degraded. Since hologram recording requires the use of a high-density method requiring up to 1 terabyte capacities of memory, degradation of the signal by aberrations is significant.

Figure 1:
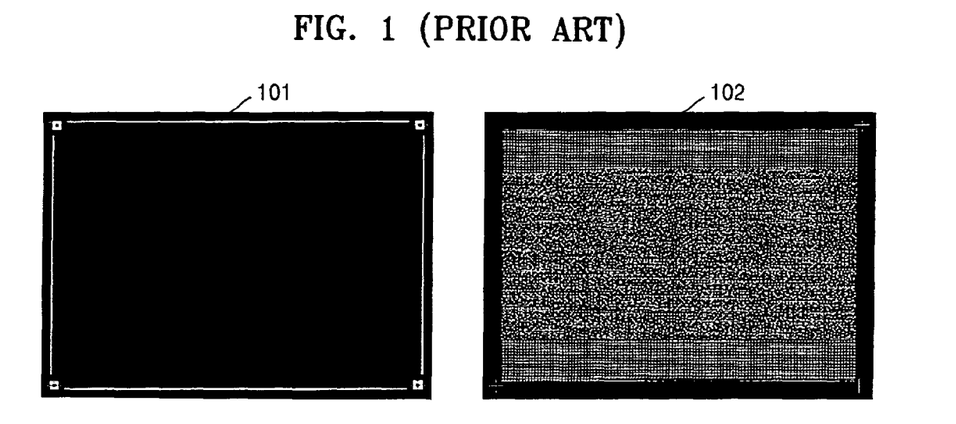
FIG. 1 illustrates a reference page for position correction and a data page according to conventional technology.

FIG. 1 illustrates a reference page used for position correction and a data page according to conventional technology. As illustrated in FIG. 1, a reference page 101 is recorded first. Then, a data page is recorded. The reference page 101 is used to correct signal degradation caused by shifting, expansion, or reduction of the entire image when data is recorded and reproduced, and includes markers functioning as references for position correction. When data is reproduced, the reference page 101 is reproduced first, and reference markers of the data page 102 are set based on the reference markers positioned at the four corners of the reference page 101. Then, by matching the positions of the reference markers at the four corners on the data page 102 with the positions of the reference markers of the reference page 101, the position of the data page 102 is corrected to correct a distortion of the entire image which occurs during data reproduction.

Figure 2:
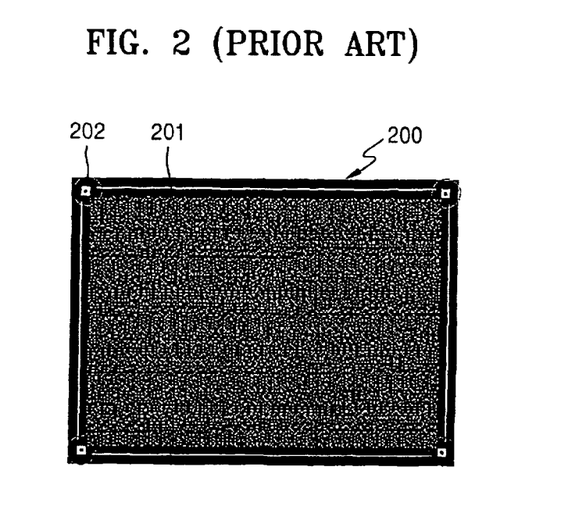
FIG. 2 illustrates the shape of a page generated from a reference page and a data page.

FIG. 2 illustrates the shape of a page 200 generated from the reference page 101 and the data page 102 of FIG. 1. As illustrated in FIG. 2, by recording and reproducing the page 200 so that the reference position markers 202 and data 201 are formed together, the positions may also be corrected.

However, when a recorded image experiences partial deformation caused by an aberration of an optical apparatus, the signal quality cannot be corrected simply by correcting shifting, expansion or reduction of the entire image. For instance, if a spherical aberration causes blurring in the center of the image, then even though there is no deformation at the edges of the image, degradation of a signal occurring by deformation, which is caused by distortion of images with respect to positions of a data page, occurs. When data recorded on a hologram recording medium is reproduced using the same apparatus that recorded the data, the error is predictable because the degradation component caused by the aberration is identical both during the recording of and reproducing of the data. Accordingly, when the same apparatus is used to record and reproduce data recorded on a hologram recording medium, any degradation which occurs may be corrected by image processing.

However, when the apparatus used to reproduce data is different from the apparatus used to record the data, the optical system used to reproduce the data is different from the optical system used to record the data, and thus, the aberration changes. Accordingly, when hologram recording and reproducing apparatuses having different optical system characteristics are used, the image is degraded by the change in the aberration, and the reproduced signal deteriorates further.

Figure 3:
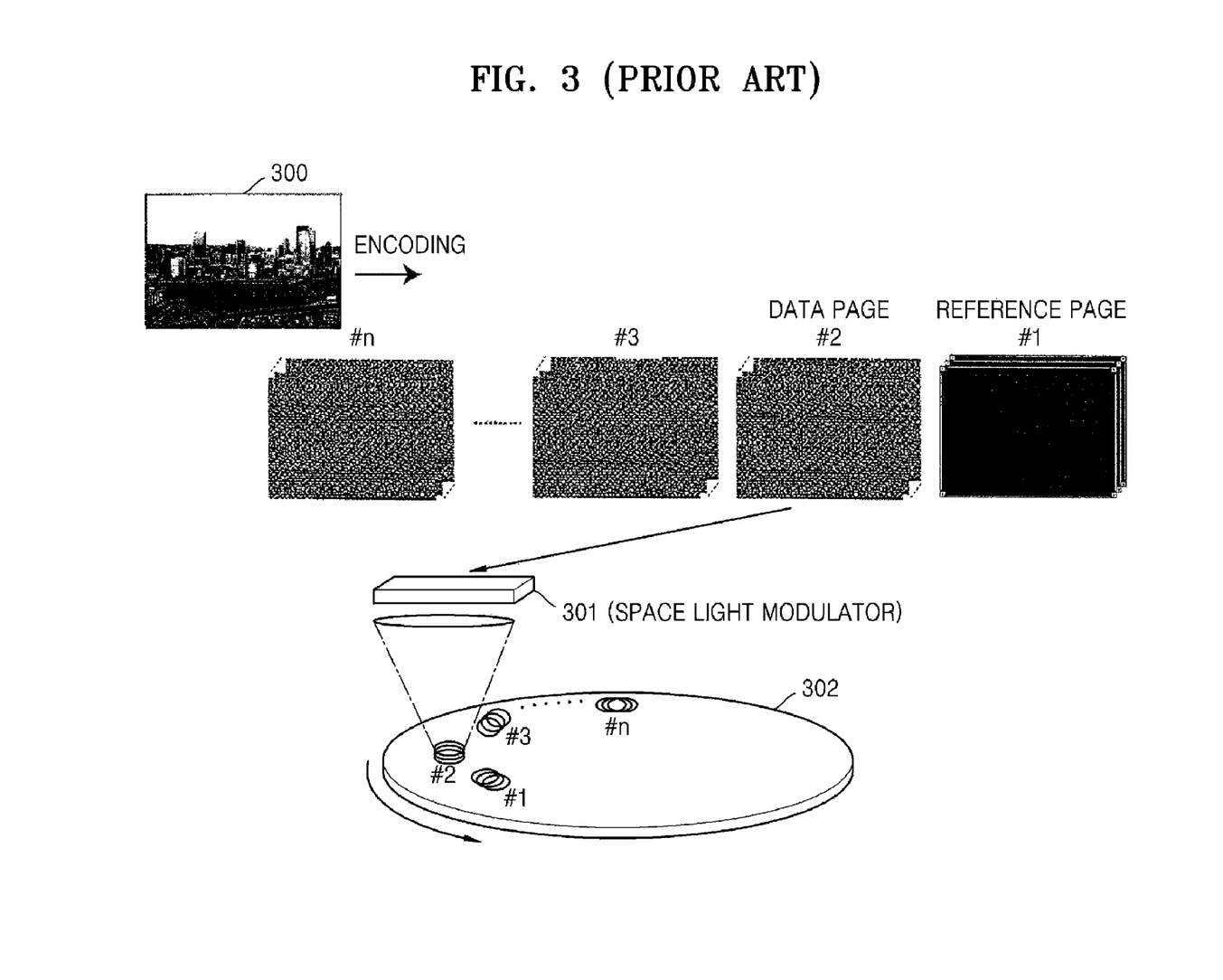
FIG. 3 illustrates a method of recording a hologram according to conventional technology.

FIG. 3 illustrates a method of recording a hologram according to conventional technology. In a hologram recording and reproducing system, a laser beam having an interference characteristic is split into a signal beam and a reference beam, and the intensity of the signal beam is modulated with respect to the data to be recorded by a spatial light modulator (SLM) 301. The modulated signal beam and the reference beam are then combined on a hologram recording medium 302. The signal beam and the reference beam interfere with each other and the resulting interference pattern is recorded as a recording spot (#1, #2, #3, . . . , #n) on the recording medium 302. The recording spots are then recorded at different positions as the hologram recording medium 302 is rotated in the direction indicated by an arrow.

In order to reproduce data recorded on a hologram recording medium, an illumination beam, having the same characteristics as the reference beam, is applied to the hologram recording medium at the same angle as the reference beam. Then, data is reproduced as a diffraction beam corresponding to the interference pattern recorded on the hologram recording medium. This diffraction beam is then collected by an image pickup device, such as a CCD or a CMOS device, and received as a bit pattern. The light signal received by the image pickup device is interpreted and reproduced as data.

Figure 4:
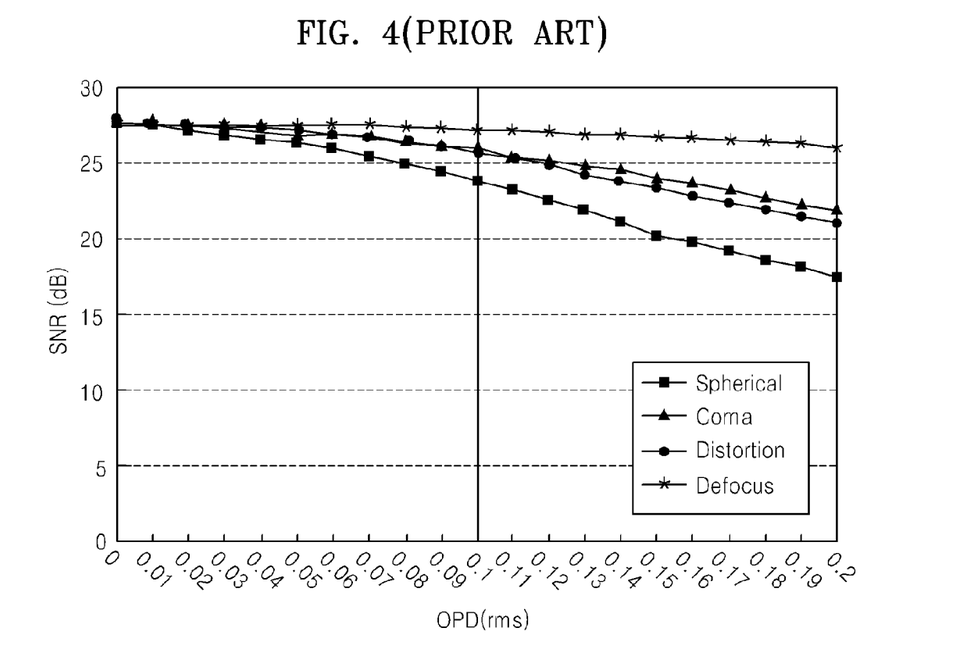
FIG. 4 illustrates the degradation of a signal due to the difference between optical paths.

FIG. 4 illustrates degradation of a signal due to an optical path difference (OPD). As illustrated in FIG. 4, degradation of the signal caused by defocusing aberration, which in turn is caused by the OPD, is relatively small, while the influence of degradation caused by spherical aberration, distortion and coma is relatively large. Generally, a total of 0.05 $\lambda$rms of the OPD of an optical system may occur in a recording or reproducing apparatus. Thus, the maximum OPD which may occur when using an apparatus to record data which is different from an apparatus used to reproduce data is the sum of the recording and reproducing aberrations (0.05 $\lambda$rms +0.05 $\lambda$rms), or approximately 0.1 $\lambda$rms. Referring to FIG. 4, it can be seen that the degradation of the signal increases up to at least several decibels.

Meanwhile, a laser diode currently sold by Sony to be used with holographic memory has an aberration higher than 0.05 $\lambda$rms. If the influence of this aberration is also considered, the maximum aberration that can occur between hologram recording and reproducing apparatuses can reach 0.2 $\lambda$rms, causing signal degradation of up to 60%, as illustrated in FIG. 4. This level of degradation may vary depending on which noise components are included in the system and the signal.

SUMMARY OF THE INVENTION

Aspects of the present invention provide a hologram recording and/or reproducing apparatus, a hologram recording and/or reproducing method, and a hologram recording medium which corrects distortion and deformation that can occur in part of an image due to degradation of a signal caused by aberrations.

Aspects of the present invention also provide a hologram recording and/or reproducing apparatus, a hologram recording and/or reproducing method, and a hologram recording medium which enhance compatibility between different hologram recording and/or reproducing apparatuses by preventing degradation of a signal by aberrations.

Additional aspects and/or advantages of the invention will be set forth in part in the description which follows and, in part, will be obvious from the description, or may be learned by practice of the invention.

According to an aspect of the present invention, a hologram recording apparatus includes a data processing unit to generate a data page which contains recording data and to generate a reference page which includes predetermined patterns to prevent distortion of a signal that occurs when the data page is reproduced, and a light processing unit to record the data page and reference page on a hologram recording medium.

According to another aspect of the present invention, a hologram reproducing apparatus includes a data processing unit to generate a data page which includes recording data and a reference page which includes predetermined patterns, wherein the reference page is compared to the data page to prevent distortion of a signal from when the data page is reproduced, and a light processing unit to record the data page and the reference page on a hologram recording medium.

According to another aspect of the present invention, a hologram recording method includes generating a data page including recording data; generating a reference page including predetermined patterns to prevent distortion of a signal from occurring when the data page is reproduced, and recording the data page and the reference page on a hologram recording medium.

According to another aspect of the present invention a hologram reproducing method includes reproducing a reference page including predetermined patterns to prevent distortion of recording data from occurring when a data page is reproduced, determining position correction vectors corresponding to positions of the predetermined patterns of the reproduced reference page, reproducing the data page in which the recording data is recorded, and correcting the reproduced data page based on the position correction vectors.

According to another aspect of the present invention, a hologram recording medium includes a data page including recording data; and a reference page including predetermined patterns to prevent distortion of a signal occurring when the data page is reproduced.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 5:
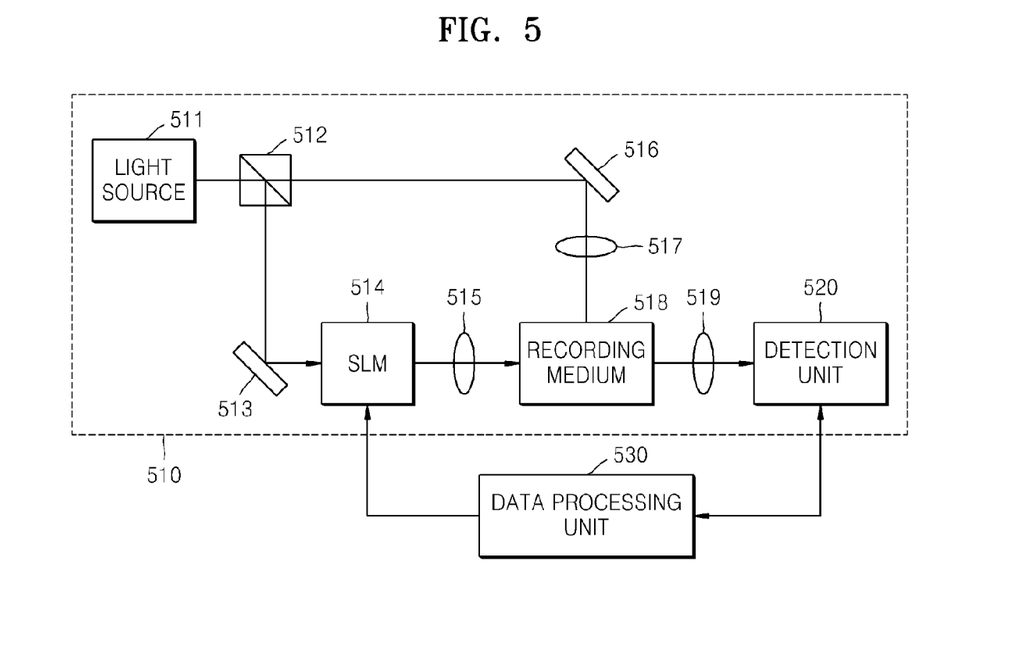
FIG. 5 is a schematic diagram of an apparatus to record and/or reproduce a hologram according to an embodiment of the present invention.

FIG. 5 is a schematic diagram of an apparatus to record and/or reproduce a hologram according to an embodiment of the present invention.

The apparatus to record and/or reproduce a hologram comprises a light processing unit 510 into which a hologram recording medium 518 is inserted, and a data processing unit 530 to record data by controlling the light processing unit 510 and/or to reproduce recorded data from the light processing unit 510. The light processing unit 510 includes a laser light source 511, a beam splitter 512, a first reflection mirror 513, a spatial light modulator 514, a first lens 515, a second reflection mirror 516, a second lens 517, a third lens 519, and a detection unit 520. It is understood that the light processing unit 510 shown in FIG. 5 may use other components instead of or in addition to the components shown and described.

The data processing unit 530 generates a data page which includes recording data, and a reference page on which patterns are formed to prevent distortion of a signal obtained when the data page is reproduced. Referring to FIG. 5, the recording data, such as an image, of the present embodiment is displayed on a spatial light modulator 514 under the control of the data processing unit 510.

A laser beam outputted from the laser light source 511 and having an interference characteristic is incident on the beam splitter 512. The beam splitter 512 splits the laser beam into a reference beam (a first beam) and a signal beam (a second beam). The signal beam indicates recording data and is incident on the spatial light modulator 514. The spatial light modulator 514 spatial light modulates (i.e., amplitude modulates) the signal beam. The modulated signal beam is then transmitted to the hologram recording medium 518 by the first lens 515.

Meanwhile, the reference beam is reflected by the second reflection mirror 516 and transmitted to the hologram recording medium 518 by the second lens 517. Accordingly, an interference pattern is formed by the overlapping of the signal beam and the reference beam and recorded as a fine dense-sparse pattern on the hologram recording medium 518. Thus, the data processing unit 530 generates information on the reference page and the data page displayed on the spatial light modulator 514 so that the reference page and the data page may be recorded on a recording spot of the hologram recording medium 518.

Figure 7:
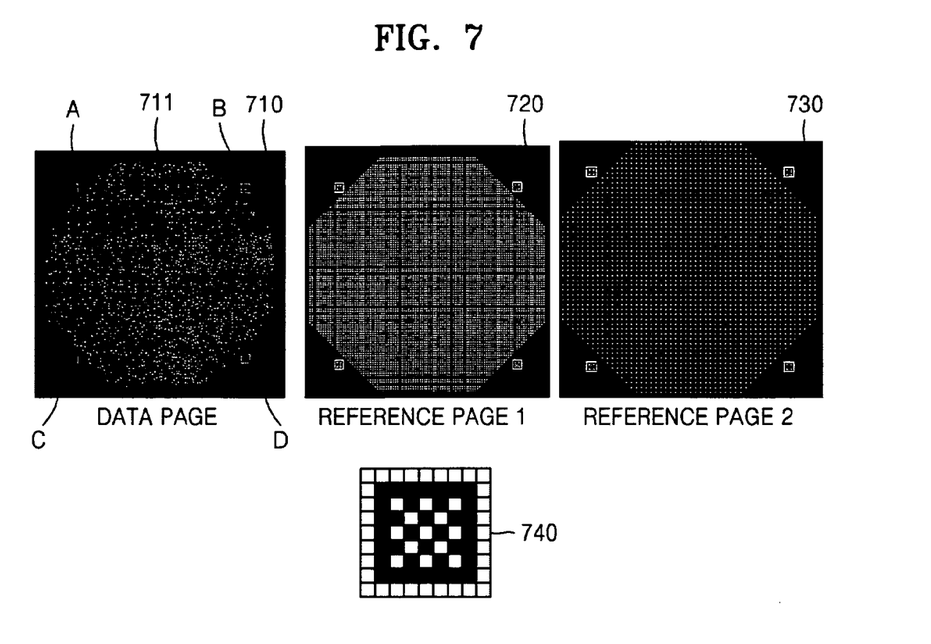
FIG. 7 illustrates hologram reference pages according to another embodiment of the present invention.

According to an embodiment of the present invention, the data processing unit 530 generates a reference page. On the reference page, a 2-dimensional (2D) figure is formed which includes a predetermined pattern contained in the reference page and arranged in a predetermined form, such as, for example, the form of a mesh or a plurality of dots separated at predetermined intervals, as shown in FIG. 7. When a 2D figure including the predetermined patterns is generated, the data processing unit 530 generates a reference page by using the data page structure recorded in a data page to determine the shape of the figure of the reference page.

Also, when generating a data page, the data processing unit 530 includes reference position markers located at positions corresponding to the corners of a shape formed by predetermined patterns included in a reference page, or corresponding to the positions of reference position markers arranged at predetermined positions of a reference page. The data processing unit 530 may also control the light processing unit 510 so that one page out of a predetermined number of data pages may be recorded on a hologram recording medium.

The light processing unit 510 may record a reference page and a data page on a hologram recording medium at different times. Alternatively, the light processing unit 510 may record a reference page and a data page at the same time.

In order to reproduce data recorded on a hologram recording medium, an illumination beam having characteristics identical to the characteristics of a reference beam is directed onto the hologram recording medium 518 in such a way that data is reproduced as a diffraction beam corresponding to an interference pattern recorded on the hologram recording medium 518. This diffraction beam is then concentrated by the third lens 519 on the detection unit 520, which includes a circuit, such as a CCD or a CMOS device. Then, a reproduction signal outputted from the detection unit 520 is transferred to the data processing unit 530. Then, if a conjugate reference beam (not shown) is used as an illumination beam when data is reproduced, a beam is generated in the opposite direction to the beam used when the data was recorded on the medium, and the effect of distortion of the medium is minimized. A method of reproducing data on a hologram recording medium according to an embodiment of the present invention will be explained in more detail later.

Meanwhile, in a hologram recording medium, if selectivity is big, aspects of the present invention ensure that data is reproduced relatively reliably, despite problems such as the deformation of the hologram recording medium. The thickness of the medium is inversely proportional to the selectivity. Accordingly, as the hologram recording medium gets thicker, the selectivity gets smaller, and as the recording medium gets thinner, the selectivity gets larger. For example, when an angle multiplexing method is used as a hologram recording method, if the thickness of the hologram recording medium is 1.5 mm, the selectivity is about 0.02°, but if the thickness of the hologram recording medium decreases to 10 μm, the selectivity increases to 4°.

Generally, as selectivity increases, the ability to record data through overlapping decreases. Accordingly, in order to record data at a high density, the selectivity should be reduced. However, in embodiments of the present invention, since efficient reproduction of a reference page is first required, a predetermined part having high selectivity is set in the hologram recording medium, and a reference page is recorded in that part. For example, if the hologram recording medium has a circular shape, a range with a reduced thickness is set aside for the reference page. Accordingly, when data is reproduced, the reference page is easily obtained from the thin part with high selectivity. Recording conditions, environmental information from when data is recorded, and address information are examples of data that may be recorded together in the thin part of the hologram recording medium.

Figure 6A:
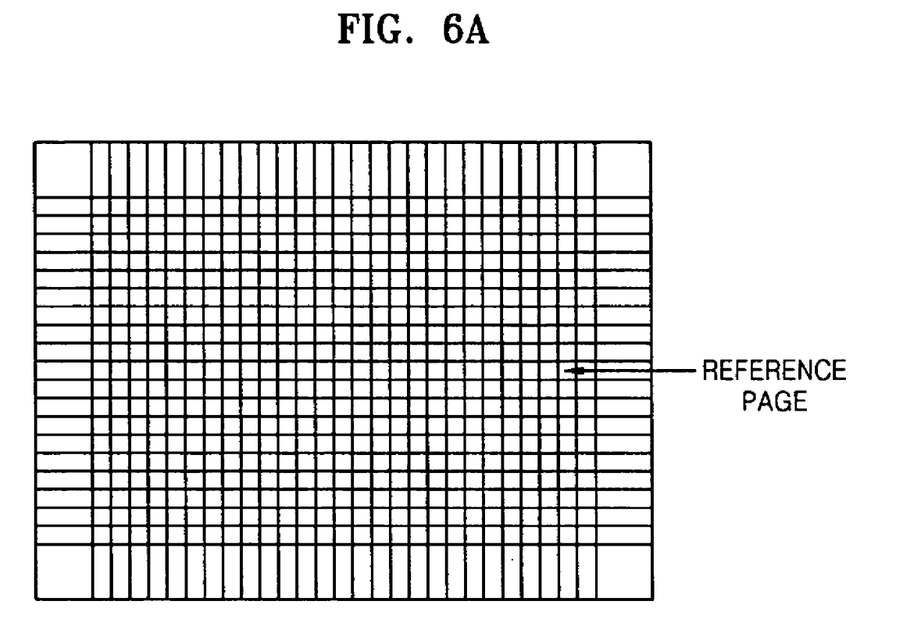
FIGS. 6A and 6B illustrate hologram reference pages according to an embodiment of the present invention.
Figure 6B:
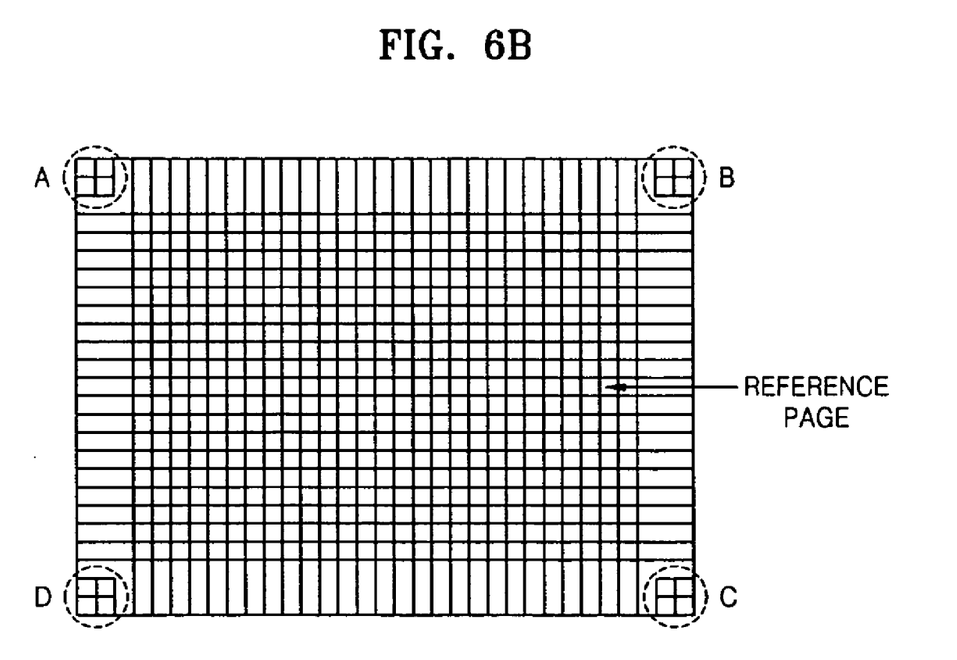

FIGS. 6A and 6B illustrate hologram reference pages according to an embodiment of the present invention. A hologram reference page according to an embodiment of the present invention is a page which prevents signal degradation caused by aberrations. The hologram reference page may be formed with mesh patterns in an overall rectangular shape, as illustrated in FIG. 6A. Also, the hologram reference page according to an embodiment of the present invention may be formed to further include reference position markers. These position markers may be located in various positions on the hologram reference page, such as, for example, at the positions labeled A, B, C, and D, in FIG. 6B, together with the mesh patterns formed as the rectangular shape.

The outline formed by the patterns in the hologram reference page may be various shapes in order to effectively correct signal distortion. For example, the outline may be rectangular, or may be the same shape as the structure of a data page. For example, if the structure of a data page is circular, the shape of the mesh patterns of the reference page may also be circular. Alternatively, if the structure of a data page is octagonal, the shape of the patterns of the reference page may also be octagonal, as illustrated in FIG. 7 and explained below.

FIG. 7 illustrates hologram reference pages according to another embodiment of the present invention. Data is recorded in a data page 710 in FIG. 7 in an octagonal area, and includes reference position markers at positions A, B, C, and D of the data page 710. A reference page may be formed as various types, such as the type-1 reference page 720 or type-2 reference page 730 shown in FIG. 7. In the type-1 reference page 720, predetermined patterns of the reference page are octagonal and mesh patterns are formed inside. In the type-2 reference page 730, predetermined patterns of the reference page are octagonal and dot patterns are formed inside.

Also, as shown in the data page 710 illustrated in FIG. 7, a data page according to an embodiment of the present invention may include reference position markers at the same positions as the reference pages 720 and 730. Furthermore, the data page may include reference position markers at the corners of a shape including predetermined patterns of a reference page.

Reference number 740 is an example showing reference position markers located at positions A, B, C, and D. Since the shape of the reference position markers sets a reference position, the shape may be as illustrated in FIG. 6 or FIG. 7, or may take a variety of other forms as well.

Figure 8:
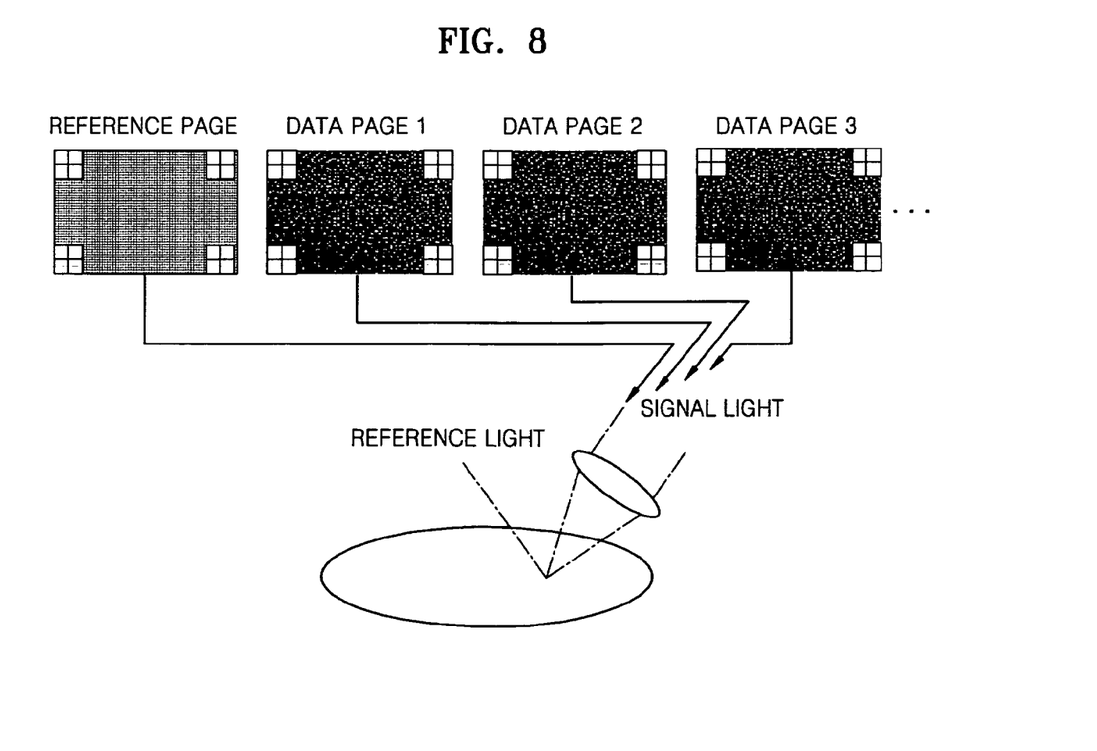
FIG. 8 illustrates a process of recording data in an apparatus to record and/or reproduce a hologram according to an embodiment of the present invention.

FIG. 8 illustrates a process of recording data in an apparatus to record and/or to reproduce a hologram according to an embodiment of the present invention. According to an embodiment of the present invention, as illustrated in FIG. 8, a reference page is first recorded on a hologram recording medium, and then data pages may be sequentially recorded. One or more reference pages may be recorded at a predetermined position on the hologram recording medium. In the case of a medium in which distortion of an image may change gradually due to various factors, such as, for example, an uneven cover glass on the light processing unit 510, one reference page may be used for each predetermined number of data pages.

Accordingly, when data on a recording medium is reproduced, distortion of an image may be corrected by updating data with respect to a reference page. Though reference pages may be recorded at many positions of a hologram recording medium, the selection of an appropriate number of reference pages is important because reference pages take space which could otherwise be used for recording data.

Though the reference page is recorded first in FIG. 8, a reference page may be recorded after all data pages have been recorded, or between recording data pages. In a hologram reproducing apparatus according to an embodiment of the present invention, information on the position of a reference page is stored in advance and is used to locate the reference page. The reference page is reproduced first and referred to when determining a correction value before reproducing data pages.

Figure 9:
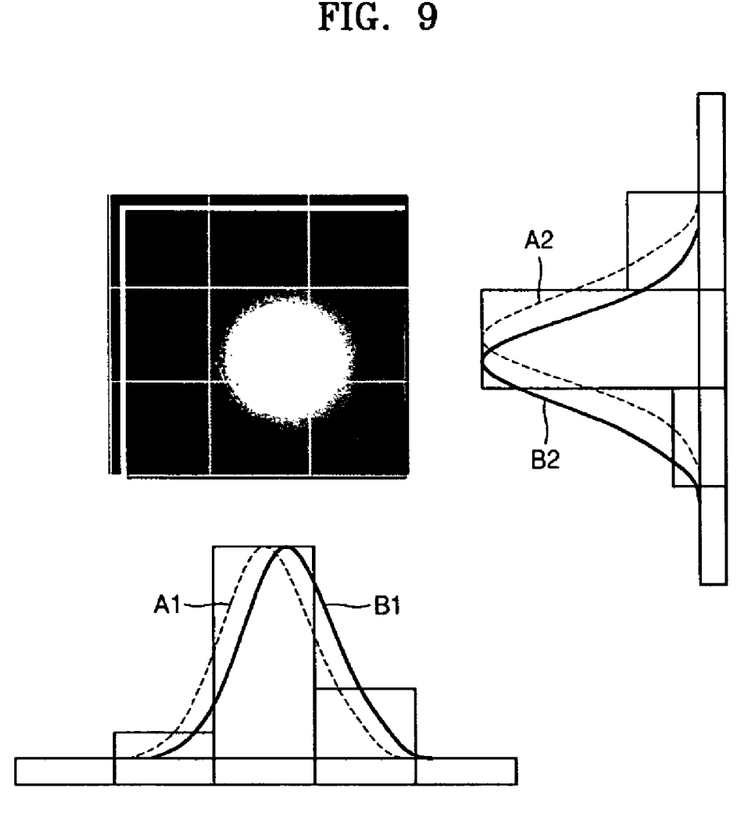
FIG. 9 illustrates the determination of a position correction vector using a method of reproducing a hologram according to an embodiment of the present invention.

FIG. 9 illustrates how to determine a position correction vector in a method of reproducing a hologram according to an embodiment of the present invention. FIG. 9 shows the results of measuring beam intensity and beam distribution in a pattern period of a data page in relation to a reproduction signal of a recording page detected by a hologram reproduction apparatus. Hereinafter, a mesh area in which the data is recorded is referred to as a pixel.

Referring to FIG. 9, the beam intensity distribution chart shown on the right-hand side of FIG. 9 is obtained by adding the intensities of 3 pixels in each row, and the beam intensity distribution chart shown at the bottom of FIG. 9 is obtained by adding the intensities of 3 pixels in each column. The beam intensity distribution charts may be depicted in various ways. Here, the beam distribution is shown by expressing beam intensity as a Gaussian distribution.

If no distortion occurs in a reproduction signal of a recording page, the beam intensity of the center pixel of 9 pixels is the most intense, and the Gaussian distribution will have the shapes A1 and A2 of FIG. 9. If distortion does occur, the beam distribution measured from the reproduction signal of the recording page is shifted from the original positions, as indicated by B1 and B2 in FIG. 9.

Accordingly, by measuring the beam intensity of a reproduction signal of a reference page, the data processing unit 530 of FIG. 5 can measure the distortion of a recording page. By using the coordinate values of the corners of the original Gaussian distribution of the reference page and the coordinate values of the corners of the Gaussian distribution of a reproduction signal of an actual reference page, a position correction vector can be determined. For example, if a corner of a Gaussian distribution of a reproduction signal of the original reference page is located at the coordinate (x1,y1) and the corresponding corner of a Gaussian distribution of a reproduction signal of an actual reference page is located at the coordinate (x2,y2), the coordinate values (x1-x2,y1-y2) may be used to determine the direction and magnitude of a position correction vector.

Figure 10:
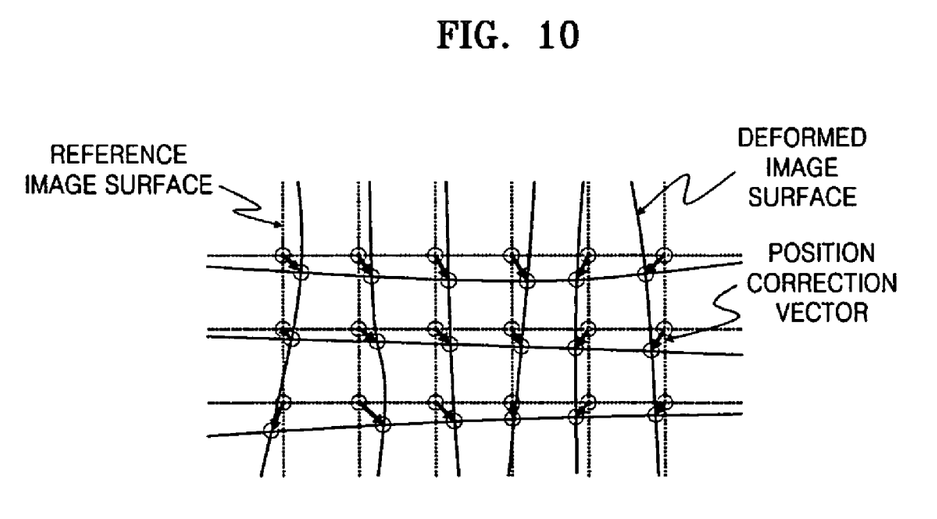
FIG. 10 illustrates the correction of the partial deformation of an image recorded onto a hologram recording medium according to an embodiment of the present invention.

FIG. 10 illustrates the correction of partial deformation of an image of a hologram recording medium according to an embodiment of the present invention. Referring to FIG. 10, a reference page that should be originally reproduced is expressed as a reference image surface by dotted lines, and the reference page that is actually reproduced is expressed by solid lines. The solid lines illustrate that the reference image surface is deformed. If the position of each predetermined pattern, that is, the position of each intersection of the mesh pattern, is determined as explained with reference to FIG. 9, a position correction vector in relation to each intersection as illustrated in FIG. 10 may be determined. Accordingly, a position correction table is generated, comprising position correction vectors corresponding to respective intersections. The position correction table may be used to correct deformation of a reproduction signal in relation to a data page recorded on a hologram recording medium.

Figure 11:
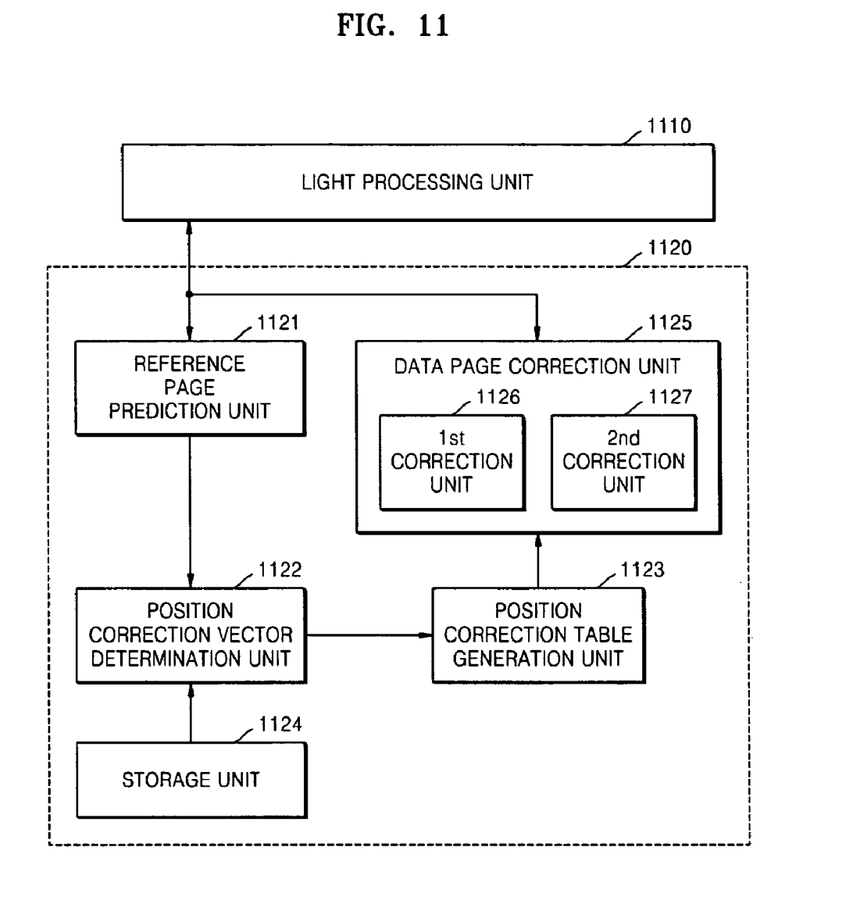
FIG. 11 is a block diagram of a hologram reproducing apparatus according to an embodiment of the present invention.

FIG. 11 is a block diagram of a hologram reproducing apparatus according to an embodiment of the present invention. The hologram reproduction apparatus according to an embodiment of the present invention comprises a light processing unit 1110 and a data processing unit 1120. In an embodiment of the present invention, the light processing unit 1110 includes the same elements as the light processing unit 510 of FIG. 5. The light processing unit 1110 reproduces a reference page and a data page from recording spots. The data page contains recording data and the reference page has predetermined patterns to prevent distortion of data when the data page is reproduced.

The data processing unit 1120 determines a position correction vector corresponding to the position of a predetermined pattern in the reference page. The data processing unit 1120 corrects the data page which has been successfully reproduced, based on the position correction vector. The data processing unit 1120 comprises a reference page prediction unit 1121, a position correction vector determination unit 1122, a position correction table generation unit 1123, a storage unit 1124, and a data page correction unit 1125.

The reference page prediction unit 1121 determines a period in which a predetermined pattern appears from a reference page and uses that period to predict the original reference page. As illustrated in FIG. 9, the period in which a predetermined pattern appears is determined to be a 3×3 pixel area which allows the original reference page, in which predetermined patterns are formed and no distortion occurs, to be predicted from the reproduced reference page. However, the period is not limited to being a 3×3 pixel area. For example, the period may instead be a 4×4 pixel area, a 3×5 pixel area, etc.

Then, the position correction vector determination unit 1122 determines a position correction vector corresponding to each position of the predetermined patterns by comparing the predicted reference page to the reproduced reference page. When one reference page is recorded in relation to a predetermined number of data pages on a hologram recording medium, the reference page prediction unit 1121 predicts the original reference page based on a recently reproduced recording page to allow the position correction vector determination unit 1122 to update a position correction vector in relation to a reference page.

The position correction table generation unit 1123 generates and stores a position correction table by using position correction vectors corresponding respectively to the positions of predetermined patterns.

The data page correction unit 1125 corrects a data page by using a position correction table. The data page correction unit 1125 confirms the locations of reference position markers corresponding to the corners of a shape formed of predetermined patterns included in a reference page or arranged at predetermined positions in the reference page, and confirms the locations of reference position markers on a data page corresponding to the reference position markers of the reference page. By using the reference position markers, the data page correction unit 1124 determines the positions on the data page corresponding to the positions of the predetermined patterns in the reference page, and corrects the data page using position correction vectors corresponding to the determined positions on the data page. Values stored in the position correction table are used as the position correction vectors.

If the original reference page is stored in the storage unit 1124, the position correction vector determination unit 1122 can use the stored original reference page without needing to predict the original reference page. By comparing the stored original reference page with a reproduced reference page, the position vector determination unit 1122 can determine a position correction vector in relation to the position corresponding to the position of a predetermined pattern. In this case, the position correction table generation unit 1123 generates a position correction table based on position correction vectors corresponding to each position of the predetermined patterns. Then, the data page correction unit 1125 corrects a data page by using the position correction table.

Meanwhile, the data page correction unit 1125 may comprise a first correction unit 1126 and a second correction unit 1127. The first correction unit 1126 performs first correction of a data page by using reference position markers corresponding to the corners of a shape formed of predetermined patterns included in a reference page or reference position markers arranged at predetermined positions, and by using reference position markers located on a data page at positions corresponding to the positions of the reference position markers of the reference page. More specifically, the first correction corrects shifting, rotation or skewing of the entire image using reference position markers arranged at identical positions in the reference page and the data page.

The second correction unit 1127 determines a position corresponding to the position of a predetermined pattern on the data page, and by using a position correction vector corresponding to the determined position, performs a second correction of the data page. More specifically, the second correction corrects partial deformation of an image caused by aberrations by using the reference page in which predetermined patterns are repeated to form a 2D shape, according to an embodiment of the present invention.

Figure 12:
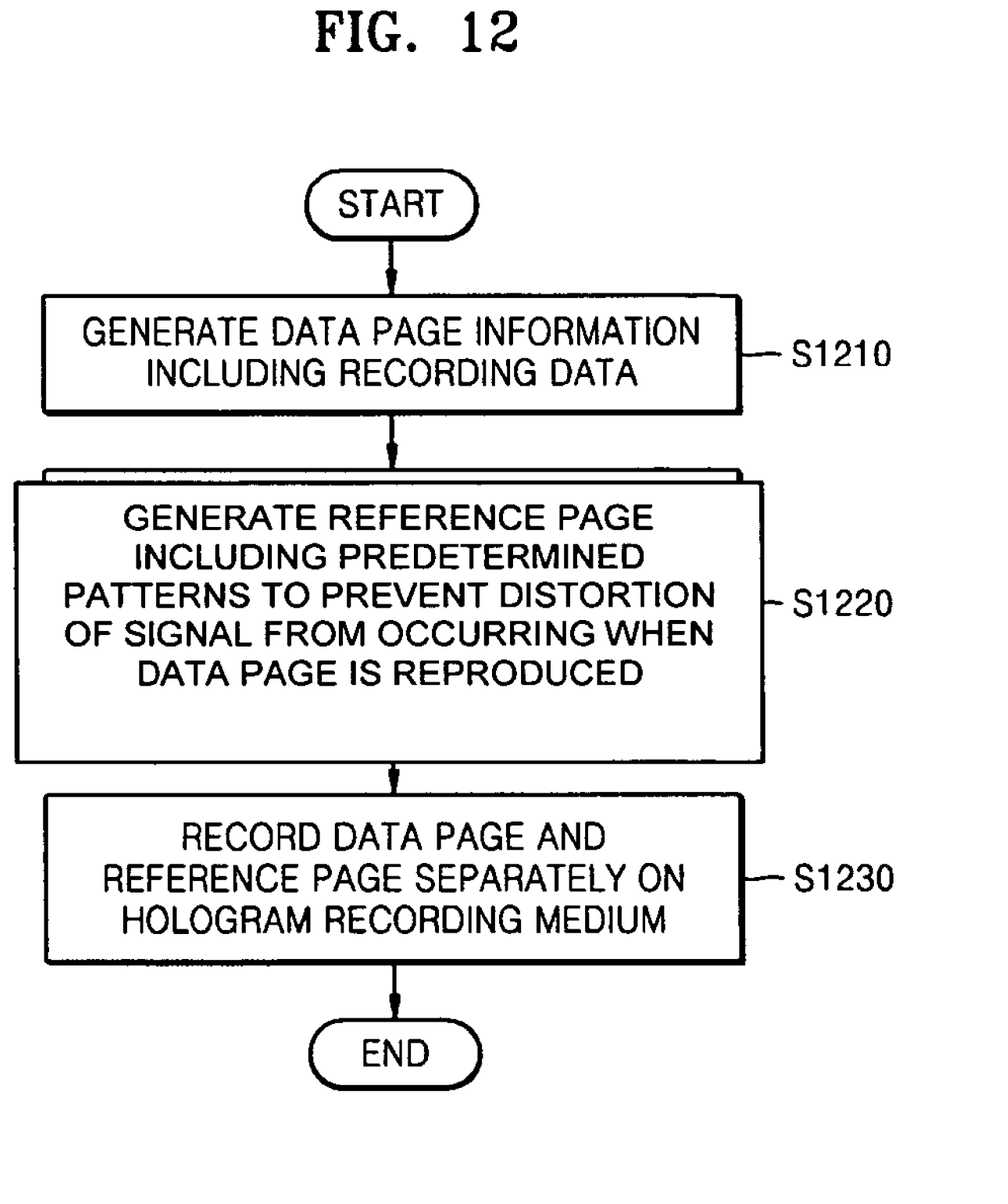
FIG. 12 is a flowchart of a hologram recording method according to an embodiment of the present invention.

FIG. 12 is a flowchart of a hologram recording method according to an embodiment of the present invention. In operation S1210, a data page including recording data is generated. In the data page, reference position markers are arranged at positions corresponding to the corners of a shape formed of predetermined patterns included in a reference page, or the positions of reference position markers arranged at predetermined positions of the reference page.

In operation S1220, a reference page is generated which includes predetermined patterns to prevent distortion of a signal when the data page is reproduced. The predetermined patterns included in the reference page may take various shapes. For example, as described above, the predetermined patterns may take a mesh shape or a shape in which a plurality of dots are arranged at predetermined intervals, and the reference page may have an outline of a 2D figure.

In generating the reference page during operation S1220, the shape of the figure formed by the predetermined patterns may be determined based on the structure of a data page in which data is recorded. Also, one reference page may be generated in relation to a predetermined number of data pages in a hologram recording medium. As explained above with reference to FIG. 8, operation S1220 may be performed before operation S1210.

In operation 1230, the data page and the reference page are separately recorded on a hologram recording medium. The data page and the reference page may be recorded at different times or at the same time on the hologram recording medium. When the data page and the reference page are recorded at different times, the data page may be recorded before or after the reference page is recorded.

Figure 13:
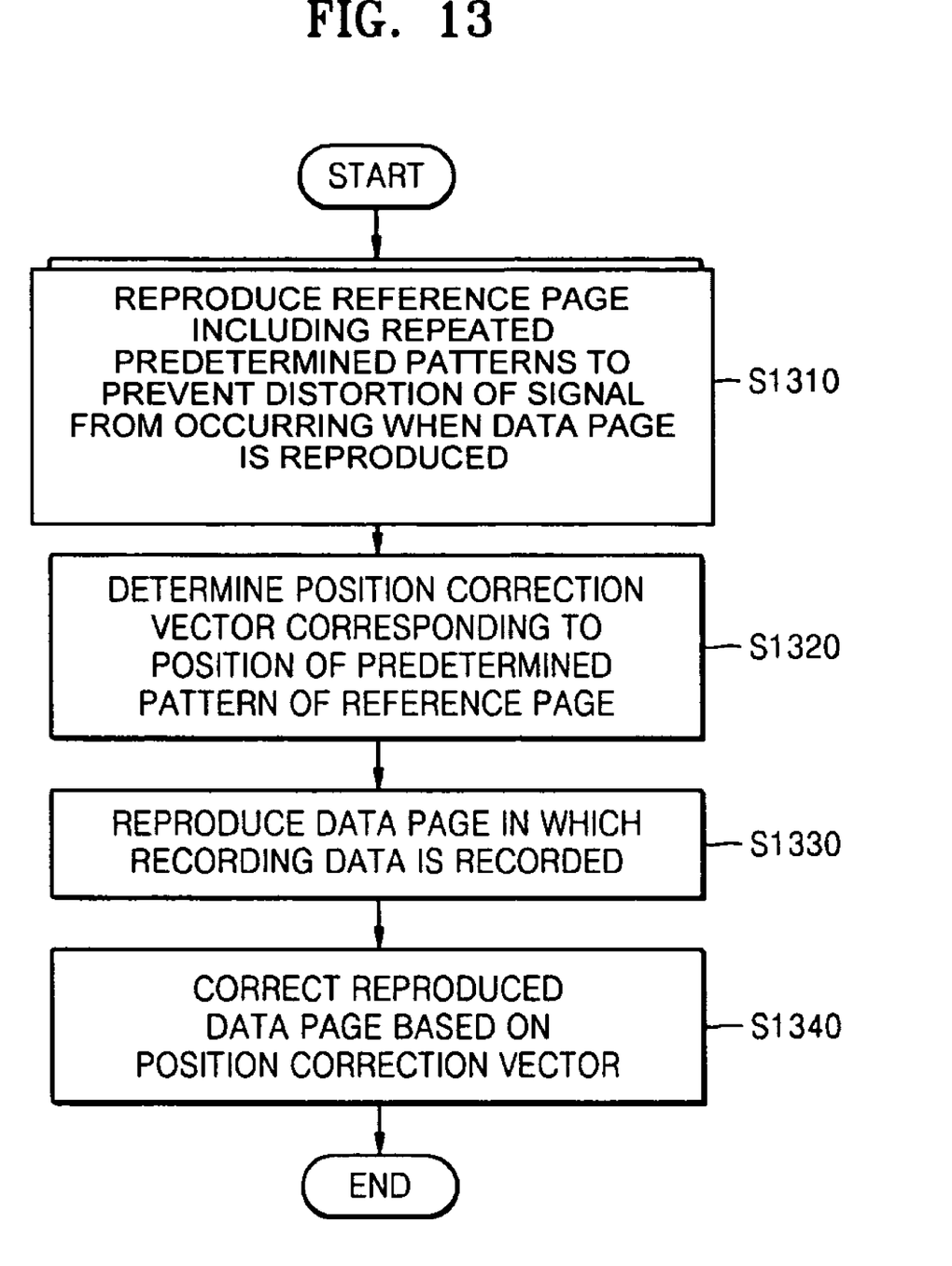
FIG. 13 is a flowchart of a hologram reproducing method according to an embodiment of the present invention.

FIG. 13 is a flowchart of a hologram reproducing method according to an embodiment of the present invention. First, in operation 1310, a reference page is reproduced which includes predetermined patterns to prevent distortion of data when a data page is reproduced.

Then, in operation 1320, a position correction vector corresponding to the position of a predetermined pattern in a reproduced recording page is determined. From the reproduced reference page, a period in which predetermined patterns appear is determined. Next, the original reference page is predicted by using the period, and a position correction vector corresponding to each position of the predetermined patterns is determined by comparing the predicted reference page with the reproduced reference page, in operation 1320. Also, the original reference page is read and a position correction vector corresponding to each position of the predetermined patterns is determined by comparing the original reference page and the reproduced reference page, in operation 1320.

In operation 1330, a data page containing recording data is reproduced.

In operation 1340, the reproduced data page is corrected based on the position correction vector determined in operation 1340. Before correcting the data page, a position correction table is generated using position correction vectors corresponding to the positions of predetermined patterns and stored in a storage unit 1124 (FIG. 11). At this point, the reproduced data page may be corrected by using the stored position correction table.

Operation 1340 will now be explained in more detail. First, the locations of reference position markers, which may be located at positions corresponding to the corners of a figure formed of predetermined patterns included in a reference page, or corresponding to the positions of reference position markers at predetermined positions in the reference page, are confirmed in the data page. Then, by using the reference position markers on the data page, positions in the data page corresponding to predetermined patterns of the reference page are determined. According to an embodiment of the present invention, each of the positions corresponding to the predetermined patterns is the position of one pixel. Then, by using the position correction vector corresponding to the determined position, the data page is corrected.

Alternatively, operation 1340 may be performed in another way. Specifically, the first correction of a data page may be performed using reference position markers corresponding to the corners of a figure formed of predetermined patterns included in a reference page, or arranged at predetermined positions in a reference page, and reference position markers on the data page corresponding to the positions of the reference position markers of the reference page. Then, positions in the data page corresponding to the positions of the predetermined patterns in the reference page may be determined and the second correction of the data page may be performed using position correction vectors corresponding to the determined positions.

The hologram recording method and the hologram reproducing method according to the embodiment of the present invention described above with reference to FIGS. 12 and 13 can be applied through a variety of multiplexing methods, such as, for example, shift multiplexing, angle multiplexing, periscopic multiplexing, and polytopic multiplexing, among other methods.

Figure 14:
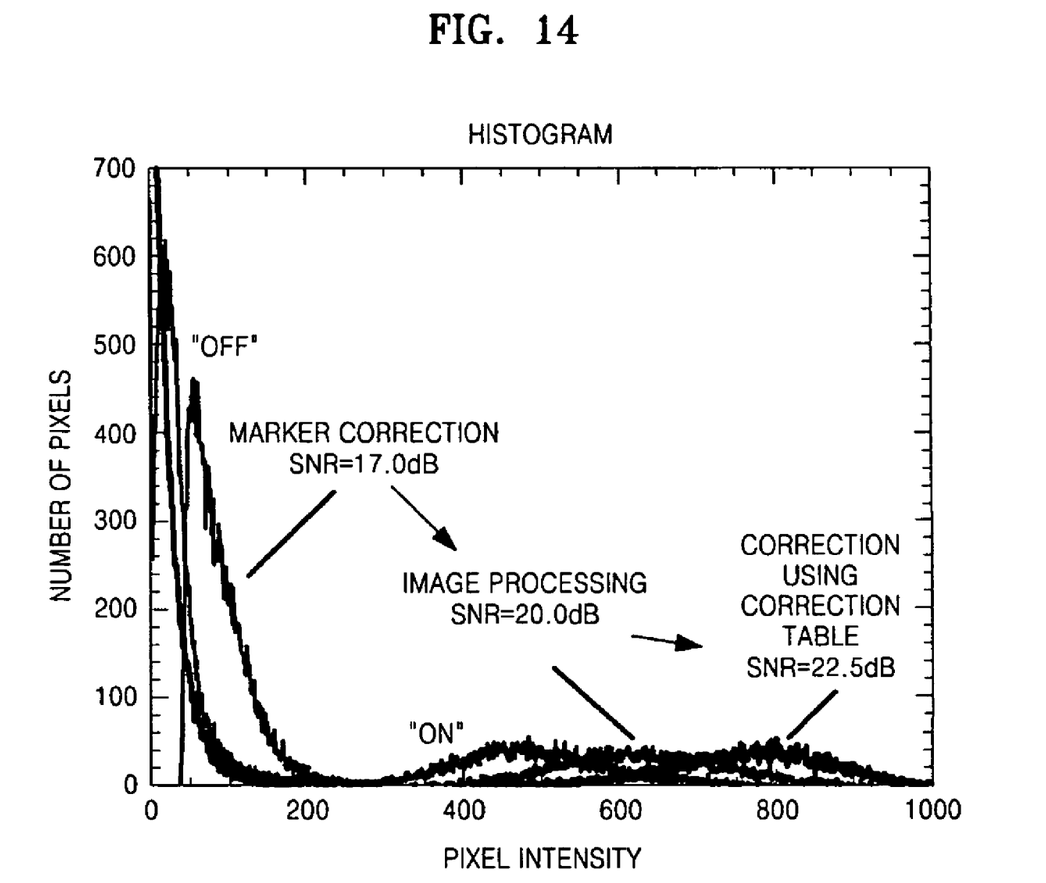
FIG. 14 is a graph illustrating the effects produced by a method of recording and/or reproducing a hologram according to an embodiment of the present invention.

FIG. 14 is a graph illustrating the effects of a method of recording and/or reproducing a hologram according to an embodiment of the present invention. FIG. 14 shows data recorded and reproduced by the same hologram recording and/or reproducing apparatus. The method of correcting a reproduction signal by using a reference page and a position correction table according to an embodiment of the present invention shows an improvement of 3~4 dB, as compared to a correction performed by using only reference position markers.

Also, the method of correcting a reproduction signal according to an aspect of the present invention shows a picture quality improvement of 2.5 dB, as compared to a method of correcting a reproduction signal using only reference position markers and image processing in order to improve clarity.

Aspects of the present invention as described above provide a hologram recording and/or reproducing apparatus, a hologram recording and/or reproducing method, and a hologram recording medium, capable of correcting distortion and deformation that may occur to part of an image due to degradation of a signal caused by aberrations.

Aspects of the present invention as described above also provide a hologram recording and/or reproducing apparatus, a hologram recording and/or reproducing method, and a hologram recording medium, capable of providing compatibility between different hologram recording and/or reproducing apparatuses by preventing degradation of a signal caused by aberrations.

Using the hologram recording and/or reproducing apparatus, hologram recording and/or reproducing method, and hologram recording medium as described above, aberrations may be corrected and compatibility may be established between different recording and/or reproducing apparatuses. Various components of the hologram recording and/or reproducing apparatus, such as, for example, the reference page prediction unit 1121 and position correction vector determination unit 1122 shown in FIG. 11, can be integrated into a single control unit, or alternatively, can be implemented in software or hardware, such as, for example, an application specific integrated circuit (ASIC). As such, it is intended that the processes described herein be broadly interpreted as being equivalently performed by software, hardware, or a combination thereof. As previously discussed, software modules can be written, via a variety of software languages, including C, C++, Java, Visual Basic, and many others. These software modules may include data and instructions which can also be stored on one or more machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Instructions of the software routines or modules may also be loaded or transported into the wireless cards or any computing devices on the wireless network in one of many different ways. For example, code segments including instructions stored on floppy discs, CD or DVD media, a hard disk, or transported through a network interface card, modem, or other interface device may be loaded into the system and executed as corresponding software routines or modules. In the loading or transport process, data signals that are embodied as carrier waves (transmitted over telephone lines, network lines, wireless links, cables, and the like) may communicate the code segments, including instructions, to the network node or element. Such carrier waves may be in the form of electrical, optical, acoustical, electromagnetic, or other types of signals.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A hologram recording apparatus, comprising:
a data processing unit configured to generate:
    a data page comprising recording data; and
    a reference page comprising a two-dimensional (2D) figure comprising predetermined periodically repeating patterns and a reference position marker outside of the 2D figure, to prevent distortion of a signal from occurring when the data page is reproduced; and
a light processing unit configured to record the data page and the reference page simultaneously on a hologram recording medium.

2. The apparatus of claim 1, wherein the predetermined patterns comprise mesh shapes or a plurality of dots, arranged at predetermined intervals, and form a 2-dimensional (2D) figure.

3. The apparatus of claim 2, wherein the data processing unit generates the data page so that reference position markers are included at positions of the data page corresponding to corners of the figure formed by the predetermined patterns included in the reference page, or positions of reference position markers arranged at predetermined positions of the reference page.

4. The apparatus of claim 2, wherein the data processing unit generates the reference page by determining a shape of the figure formed by the predetermined patterns of the reference page based on a data page structure recorded in the data page.

5. The apparatus of claim 1, wherein the data processing unit controls the light processing unit so that one reference page is recorded on the hologram recording medium for each of a predetermined number of data pages.

6. A hologram reproducing apparatus, comprising:
a light processing unit configured to reproduce a reference page and a data page from a hologram recording medium, the data page comprising recording data and the reference page comprising a two-dimensional (2D) figure comprising predetermined periodically repeating patterns and a reference position marker outside of the 2D figure, predetermined patterns being formed on the hologram recording medium to prevent distortion of the recording data from occurring when the data page is reproduced, the reference page and the data page having been recorded simultaneously; and
a data processing unit configured to generate position correction vectors corresponding to positions of the predetermined patterns of the reference page, and to correct the data page based on the position correction vectors.

7. The apparatus of claim 6, wherein the data processing unit comprises:
a reference page prediction unit configured to:
    determine a period that the predetermined patterns appear in the reference page; and predict an original reference page using the period;
a position correction vector determination unit configured to determine position correction vectors corresponding to the positions of the predetermined patterns by comparing the predicted reference page with the reproduced reference page;
a correction table generation unit configured to generate a position correction table by using the position correction vectors corresponding respectively to the positions of the predetermined patterns; and
a data page correction unit configured to correct the data page using the position correction table.

8. The apparatus of claim 6, wherein the data processing unit comprises:
a storage unit configured to store an original reference page;
a position correction vector determination unit configured to determine position correction vectors between positions of the predetermined patterns of the stored original reference page and positions of the reproduced reference page, by comparing the stored original reference page with the reproduced reference page;
a correction table generation unit configured to generate a position correction table based on the position correction vectors corresponding respectively to the positions of the predetermined patterns; and
a data page correction unit configured to correct the data page by using the position correction table.

9. The apparatus of claim 8, wherein:
the data page correction unit is further configured to determine positions in the data page by using reference position markers located at positions corresponding to corners of a figure formed by the predetermined patterns included in the stored original reference page or corresponding to positions of reference position markers arranged at predetermined positions of the stored original reference page; and
the data page correction unit is further configured to correct the data page using the position correction vectors corresponding to the determined positions.

10. The apparatus of claim 8, wherein the data page correction unit comprises:
a first correction unit configured to perform a first correction of the data page, using reference position markers corresponding to corners of a figure formed by the predetermined patterns included in the stored original reference page or arranged at predetermined positions of the stored original reference page, and reference position markers on the data page located at positions corresponding to the reference position markers of the reference page; and
a second correction unit configured to:
determine positions in the data page corresponding to the positions of the predetermined patterns of the stored original reference page; and
perform a second correction of the data page using the position correction vectors corresponding to the determined positions.

11. The apparatus of claim 7, wherein, in response to one reference page being recorded on the hologram recording medium for each of a predetermined number of data pages, the reference page prediction unit is further configured to predict the original reference page based on the recording page most recently reproduced.

12. A hologram recording method, comprising:
generating a data page comprising recording data;
generating a reference page comprising a two-dimensional (2D) figure comprising predetermined periodically repeating patterns and a reference position marker outside of the 2D figure to prevent distortion of a signal from occurring when the data page is reproduced; and
recording the data page and the reference page simultaneously on a hologram recording medium.

13. The method of claim 12, wherein the predetermined patterns of the generated reference page comprise mesh shapes or a plurality of dots arranged at predetermined intervals, and form a 2-dimensional (2D) figure.

14. The method of claim 12, wherein the generating of the data page comprises arranging reference position markers at positions corresponding to corners of the figure formed by the predetermined patterns included in the reference page or corresponding to positions of reference position markers arranged at predetermined positions of the reference page.

15. The method of claim 13, wherein the generating of the reference page comprises determining a shape of the 2D figure formed by the predetermined patterns of the reference page based on a data page structure recorded in the data page.

16. The method of claim 12, wherein the generating of the reference page comprises recording one reference page on the hologram recording medium for each of a predetermined number of data pages.

17. A hologram reproducing method, comprising:
reproducing a reference page comprising a two-dimensional (2D) figure comprising predetermined periodically repeating patterns and a reference position marker outside of the 2D figure to prevent distortion of recording data from occurring when a data page is reproduced, the reference page and the data page having been recorded simultaneously;
determining position correction vectors corresponding to positions of the predetermined patterns of the reproduced reference page;
reproducing the data page in which the recording data is recorded; and
correcting the reproduced data page based on the position correction vectors.

18. The method of claim 17, wherein the determining of the position correction vectors comprises:
determining a period that the predetermined patterns appear in the reproduced reference page;
predicting an original reference page by using the period; and
determining the position correction vectors corresponding to the positions of each of the predetermined patterns by comparing the predicted reference page with the reproduced reference page.

19. The method of claim 17, wherein the determining of the position correction vectors comprises:
reading an original reference page; and
determining the position correction vectors corresponding to the positions of each of the predetermined patterns by comparing the read original reference page with the reproduced reference page.

20. The method of claim 17, further comprising:
generating a position correction table by using position correction vectors corresponding to respective positions of the predetermined patterns,
wherein during the correcting, the reproduced data page is corrected using the stored position correction table.

21. The method of claim 17, wherein the correcting of the data page comprises:
confirming that the locations of reference position markers at positions of the data page correspond to corners of a figure formed by the predetermined patterns included in the reproduced reference page, or correspond to positions of reference position markers arranged at predetermined positions in the reproduced reference page;

determining positions corresponding to the positions of the predetermined patterns by using the reference position markers; and correcting the data page by using the position correction vectors corresponding to the determined positions.

22. The method of claim 17, wherein the correcting of the data page comprises:

performing a first correction of the data page using reference position markers corresponding to corners of a figure formed by the predetermined patterns included in the reference page or arranged at predetermined positions of the reference page, and reference position markers on the data page located at positions corresponding to the reference position markers of the reference page;

determining positions in the data page corresponding to the positions of the predetermined patterns of the reference page, and performing a second correction of the data page by using the position correction vectors corresponding to the determined positions.

23. A hologram recording medium, comprising:

a data page comprising recording data; and a reference page comprising a two-dimensional (2D) figure comprising predetermined periodically repeating patterns and a reference position marker outside of the 2D figure and configured to prevent distortion of a signal from occurring when the data page is reproduced by comparing the reference page to the data page, the reference page and the data page having been recorded simultaneously.

24. The medium of claim 23, wherein the predetermined patterns comprise mesh shapes or a plurality of dots arranged at predetermined intervals, and form a 2-dimensional (2D) figure.

25. The medium of claim 23, wherein the predetermined patterns form a figure.

26. The medium of claim 25, wherein the figure comprises one of a rectangle, a circle, or an octagon.

27. The medium of claim 23, wherein reference position markers are included in the data page at positions corresponding to corners of a figure formed by the predetermined patterns included in the reference page or corresponding to positions of reference position markers arranged at predetermined positions included in the reference page.

28. The medium of claim 23, wherein one reference page is recorded for each of a predetermined number of data pages.

29. The medium of claim 23, wherein the reference page is recorded on a part of the hologram recording medium which is thinner than other parts thereof.

\* \* \* \* \*